(12) United States Patent
Taiga (10) Patent No.: US 8,387,423 B2
(45) Date of Patent: Mar. 5, 2013

(54) BICYCLE LOCK SET CONNECTED WITH BICYCLE FRAME

(75) Inventor: Keiji Taiga, Tokyo (JP)

(73) Assignee: Crops Co., Ltd., Tokyo (JP)

( * ) Notice: Subject to any disclaimer, the term of this patent is extended or adjusted under 35 U.S.C. 154(b) by 0 days.

(21) Appl. No.: 12/967,379

(22) Filed: Dec. 14, 2010

(65) Prior Publication Data

US 2013/0019640 A1 Jan. 24, 2013

(51) Int. Cl.
*E05B 37/00* (2006.01)

(52) U.S. Cl. ......... 70/25; 70/58; 70/14; 70/232; 70/295; 70/286

(58) Field of Classification Search ............... 70/58, 14, 70/18, 232, 25, 312, 295, 24, 286, 287, 22, 70/20, 235, 234, 236, 30, 27, 288, DIG. 57, 70/28, 68, 26, 386, 233, 363
See application file for complete search history.

(56) References Cited

U.S. PATENT DOCUMENTS

| 3,973,419 | A | * | 8/1976 | Atkinson | 70/68 |
| 6,082,155 | A | * | 7/2000 | Su | 70/22 |
| 6,363,757 | B1 | * | 4/2002 | Yu | 70/28 |
| D462,887 | S | * | 9/2002 | Yu | D8/333 |
| 2008/0087049 | A1 | * | 4/2008 | Lai et al. | 70/25 |

* cited by examiner

*Primary Examiner* — Lloyd Gall
*Assistant Examiner* — David E Sosnowski
(74) *Attorney, Agent, or Firm* — Rosenberg, Klein & Lee (57) ABSTRACT

A bicycle lock set includes a main part and a connection member wherein an operation unit is located between the main part and the connection member. A shackle is movably connected to a first end of the main part and has two notches. A frame is linearly movable in the main part and has a first contact portion. A number wheel is rotatably connected to the frame and has a second contact portion which is engaged with the first contact portion. The operation unit includes an operation member which is driven and rotated by the frame and has a stud for being engaged with one of the notches when the shackle is moved toward the main part. A receiving space is defined in the operation member and a bead is partially received in the receiving space or pushed to protrude out from the main part.

10 Claims, 11 Drawing Sheets

BICYCLE LOCK SET CONNECTED WITH BICYCLE FRAME

FIELD OF THE INVENTION

The present invention relates to a bicycle lock set, and more particularly, to a bicycle lock set connected with an accessory on the bicycle frame.

BACKGROUND OF THE INVENTION

A conventional bicycle lock is designed to lock the bicycle from being stolen by locking the wheel of the bicycle or by fixing the bicycle with an object that is fixed on the ground.

The conventional bicycle lock can be operated by using a key or by inputting correct combination numbers, wherein the key has to be kept with the user and once the key is lost, the bicycle lock cannot be unlocked. The combination lock is unlocked when correct numbers are input by rotating the number disks.

The way to lock the bicycle can be cooperated with a U-shaped member or a cable, wherein the U-shaped member is used to extend through the wheel so that the wheel cannot be rotated. A base is then connected to the two ends of the U-shaped member so that the lock is locked. The cable is connected to the lock and wraps around a fixed object such as a street light post and the other end of the cable is connected to the lock.

Taiwan Patent Application No. 098209553 discloses a bicycle lock which includes a lock composed of a main part and a first piece, the main part is connected with a front light unit and a lock unit. The first piece includes an engaging recess and two holes, and the engaging recess is located between the two holes. A second piece is connected with a rear light unit and two insertions which are to be inserted into the two holes, and the lock unit is engaged with the engaging recess.

Another conventional bicycle lock is disclosed in Taiwan Patent Application No. 091216742 which discloses a main part having two slots and recesses are defined in the vertical wall of each slot and the control portion. Vertical slots are defined in the wall of the control portion and the vertical slots are in communication with the recesses. The control portion has a core which can be rotated to control the controller to extend or retract. A latch is linearly movably inserted in the recesses and an annular groove is defined in an end of the latch so as to be engaged with a stop such that one of the slots of the main part is closed. A cable has a hole in each of the two ends thereof and one of the holes is inserted into the opened slot and the latch extends through the hole. The other hole is located in the recess that can be opened and closed, and the latch can extend through said the other hole.

The bicycle lock disclosed in Taiwan Patent Application No. 098209553 is operated by using a key and cooperated with the front light unit or the rear light unit. The bicycle lock disclosed in Taiwan Patent Application No. 091216742 is operated by using a key and has a cable to connect the bicycle with a fixed object.

Nevertheless, the two conventional bicycle locks cannot be combined with bicycle frame or any accessory of the bicycle frame so that the user has to carry them or store them in a proper space.

The present invention intends to provide a bicycle lock set which can be combined with an accessory on the bicycle and the user simply inputs correct combination numbers to lock or unlock the lock set, also the lock set can be easily separated from the bicycle accessory.

SUMMARY OF THE INVENTION

The present invention relates to a bicycle lock set and comprises a main part having a shackle movably connected to a first end thereof and the shackle has at least one notch. A connection member is removably connected to a side of the main part and has a reception hole defined in a side thereof which faces the main part. A combination unit is located in the main part and has a frame which is linearly movable in the main part. The frame has at least one first contact portion and at least one number wheel is rotatably connected to the frame and located corresponding to the at least one first contact portion. The at least one number wheel has a second contact portion defined in an outer surface thereof so as to be engaged with the at least one first contact portion. An operation unit is located in the main part and has an operation member which is driven and rotated by the frame. The operation member has a stud located corresponding to the at least one notch. A receiving space is defined in the operation member and a bead is partially received in the receiving space or is pushed to be partially protruded out from the main part so as to be engaged with the reception hole. The stud is engaged with the at least one notch when the shackle is moved toward the main part.

The primary object of the present invention is to provide a bicycle lock set which is connected to any accessory of the bicycle so that the bicycle lock set is properly positioned on the bicycle.

Another object of the present invention is to provide a bicycle lock set which is unlocked by input of correct combination numbers to release the connection between the accessory and the lock set, and to unlock the shackle.

Yet another object of the present invention is to provide a bicycle lock set which can be cooperated with a cable to lock the bicycle to a fixed object.

A further object of the present invention is to provide a bicycle lock set wherein the shackle can be pushed to insert into the main part to reduce the volume required.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 6, the first embodiment of the bicycle lock set of the present invention is connected with a tool set 50 and comprises a main part 10, connection member 20, a combination unit 30 and an operation unit 40.

The main part 10 is a case and includes a shackle 11 which movably connected to a first end of the main part 10. The shackle 11 is a U-shaped shackle with two ends of different lengths. The longer end of the shackle 11 has two notches 111, 112 defined therein. The main part 10 includes a first engaging portion 12 defined in a surface thereof and a hole 13 is defined in a second end of the main part 10. A cable 60 such as a steel cable or a chain has one end secured to the hole 13. A first extension 14 is formed in the main part 10 and a hole 15 is defined through the main part 10.

The connection member 20 is removably connected to a side of the main part 10 and has a reception hole 22 defined in a side thereof which faces the main part 10. The connection member 20 includes a second engaging portion 21 extending from a surface thereof and the second engaging portion 21 is engaged with the first engaging portion 12 when the main part 10 is connected with the connection member 20.

The combination unit 30 is located in the main part 10 and has a frame 31 which is linearly movable in the main part 10. The frame 31 includes three recesses 32 and a first protrusion 311 extends from one side of the frame 31. A second extension 312 extends from the frame 31 so as to form a slot and is engaged with the first extension 14 to restrict the frame 31 from being separated from the main part 10. The frame 31 has three first contact portions 33 which are located at the inside of the three respective recesses 32. Three number wheels 34 are rotatably connected to the recesses 32 of the frame 31 and each number wheel 34 has numbers marked thereon. The number wheels 34 each include a number disk 341 and a driven member 342 which is pivotably connected to the main part 10. The second contact portion 35 is located on an outer periphery of the driven member 342 and the number disk 341 is mounted to the driven member 342 and rotates the driven disk 342. The number wheel 34 includes multiple positioning recesses 343 defined in an outer surface thereof and a spring member 36 is fixed to the main part 10. The spring member 36 includes a protrusion 361 which is engaged with one of the positioning recesses 343 to position the number wheel 34 so that the user has to apply a certain force to rotate the number wheel 34. The number wheels 34 each have a second contact portion 35 defined in an outer surface thereof so as to be engaged with the first contact portion 33. The combination unit 30 includes a first spring 37 whose two ends respectively contact the main part 10 and the frame 31 so as to provide a return force to the frame 31.

The operation unit 40 is located in the main part 10 and has an operation member 41 which is driven and rotated by the frame 31. The operation member 41 includes a stud 411 which is located corresponding to the notches 111, 112 and can be engaged with one of the notches 111, 112. The operation member 41 includes a second protrusion 412 which is pushed by the first protrusion 311 so that the operation member 41 is pivoted when the frame 31 linearly moves. A receiving space 413 is defined in the operation member 41 and a bead 42 is partially received in the receiving space 413 or is pushed to be partially protruded out from the main part 10 so as to be engaged with the reception hole 22. The bead 42 and the reception hole 22 are respectively located on the two facing surfaces of the main part 10 and the connection member 20. The stud 411 is engaged with the one of the notches 111, 112 when the shackle 11 is moved toward the main part 10. A second spring 43 has two ends thereof respectively contact the main part 10 and the operation member 41 so as to provide a return force to the operation member 41.

When assembling the combination unit 30 of the bicycle lock set, the first spring 37 is first installed to the frame 31 in the main part 10 and the first and second extensions 14, 312 are engaged with each other. The two ends of the first spring 37 respectively contact the main part 10 and the frame 31. The driven members 342 and the number disks 341 are respectively and pivotably connected to the main part 10 and located in the recesses 32. The spring members 36 are engaged with the respective positioning recesses 343.

When assembling the operation unit 40, the shackle 11 has its longer end inserted into the main part 10 and the bead 42 is engaged with the hole 15. The second spring 43 and the operation member 41 are pivotably connected to the main part 10, wherein the periphery of the receiving space 413 contacts the bead 42 to position the bead 42. The two ends of the second spring 43 respectively contact the main part 10 and the operation member 41. When the operation member 41 is rotated an angle, the stud 411 is engaged with the notch 111/112.

When assembling the tool set 50, the operation unit 40 is in opened status and the bead 42 is not exposed outside of the main part 10, the first and second engaging portions 12, 21 are engaged with each other. The operation unit 40 is then rotated to push the bead 42 to expose in the reception hole 22. This is the locked status.

Figure 1:
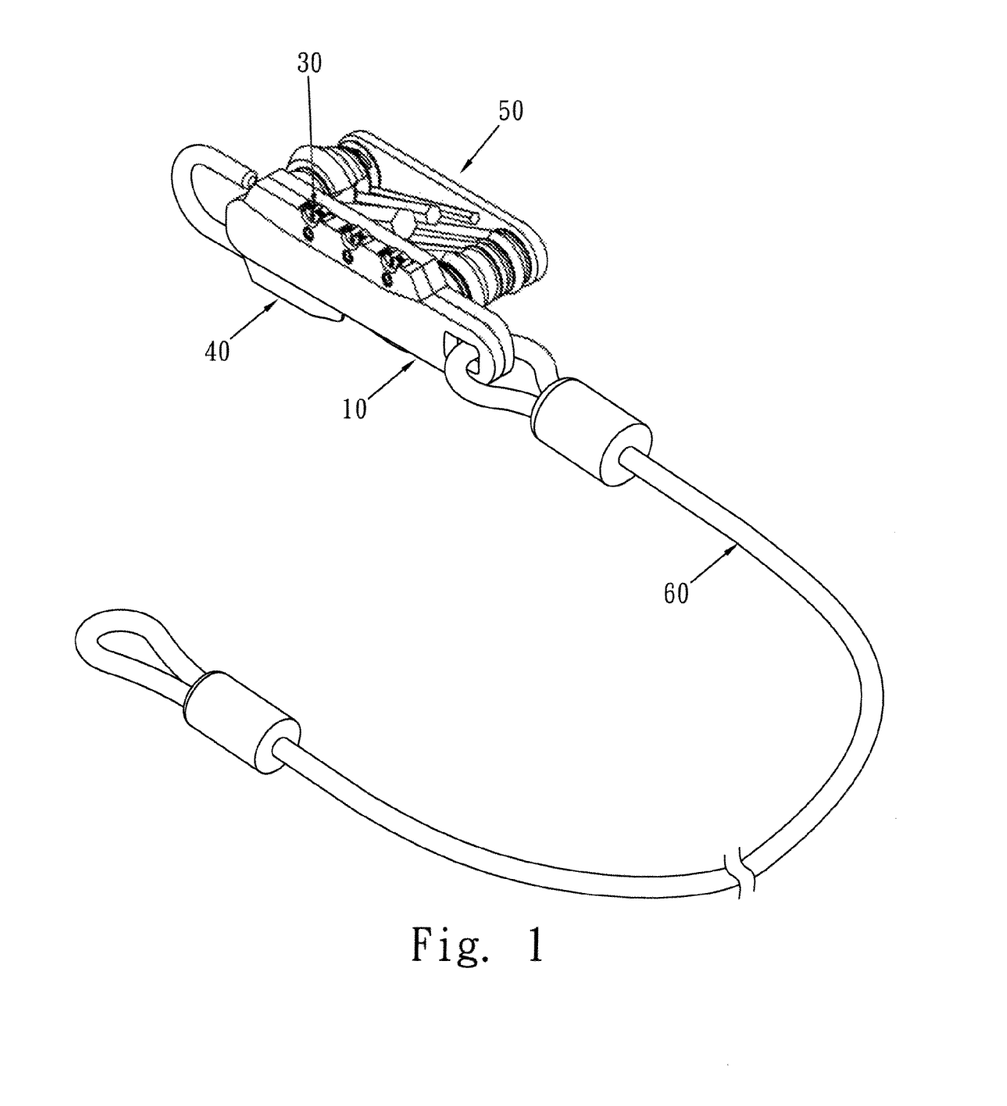
FIG. 1 is a perspective view to show the bicycle lock set of the present invention.
Figure 2:
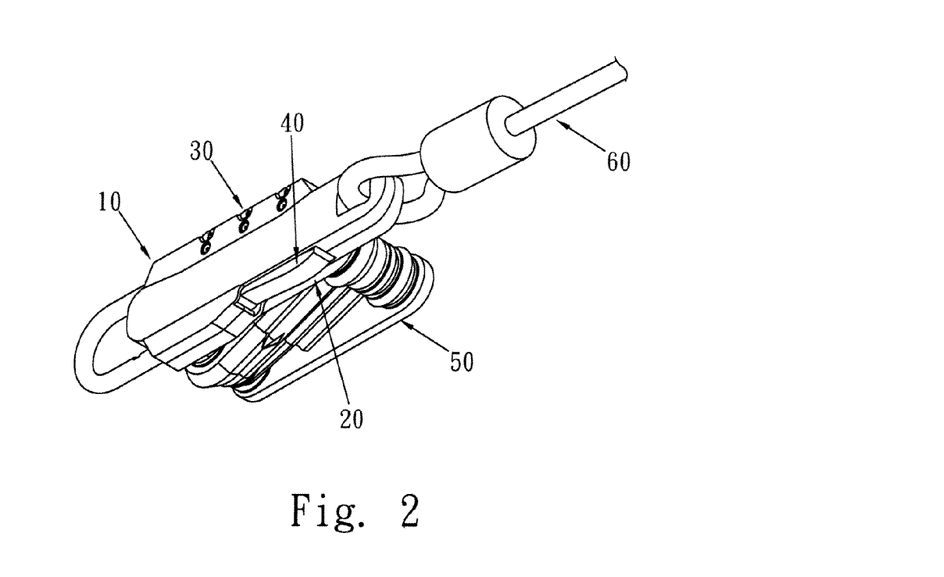
FIG. 2 is a perspective view to show that the bicycle lock set of the present invention is connected with a tool set.
Figure 3:
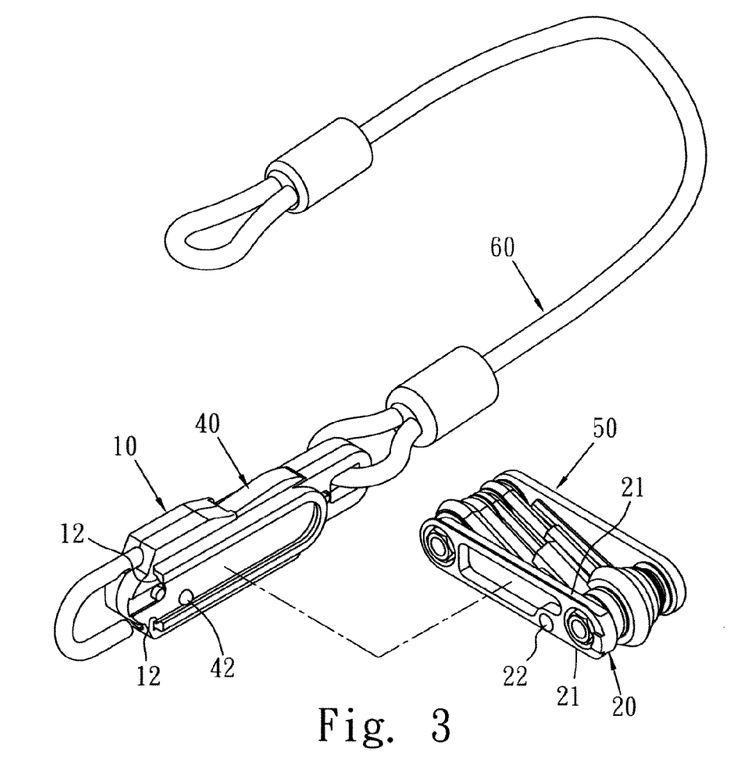
FIG. 3 is an exploded view to show the bicycle lock set of the present invention and the tool set.
Figure 4:
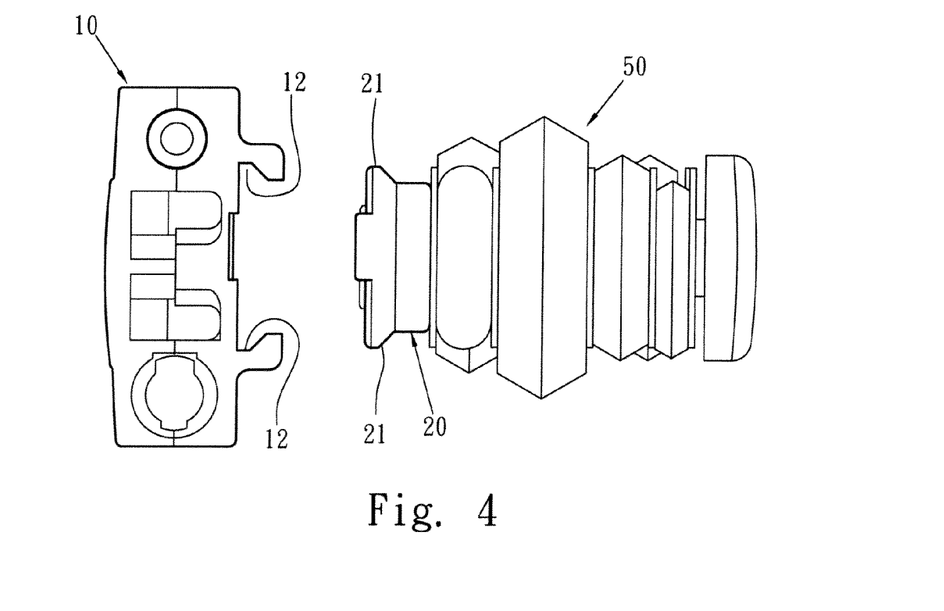
FIG. 4 is an end view to show the connection member connected with the tool set and the main part.
Figure 5:
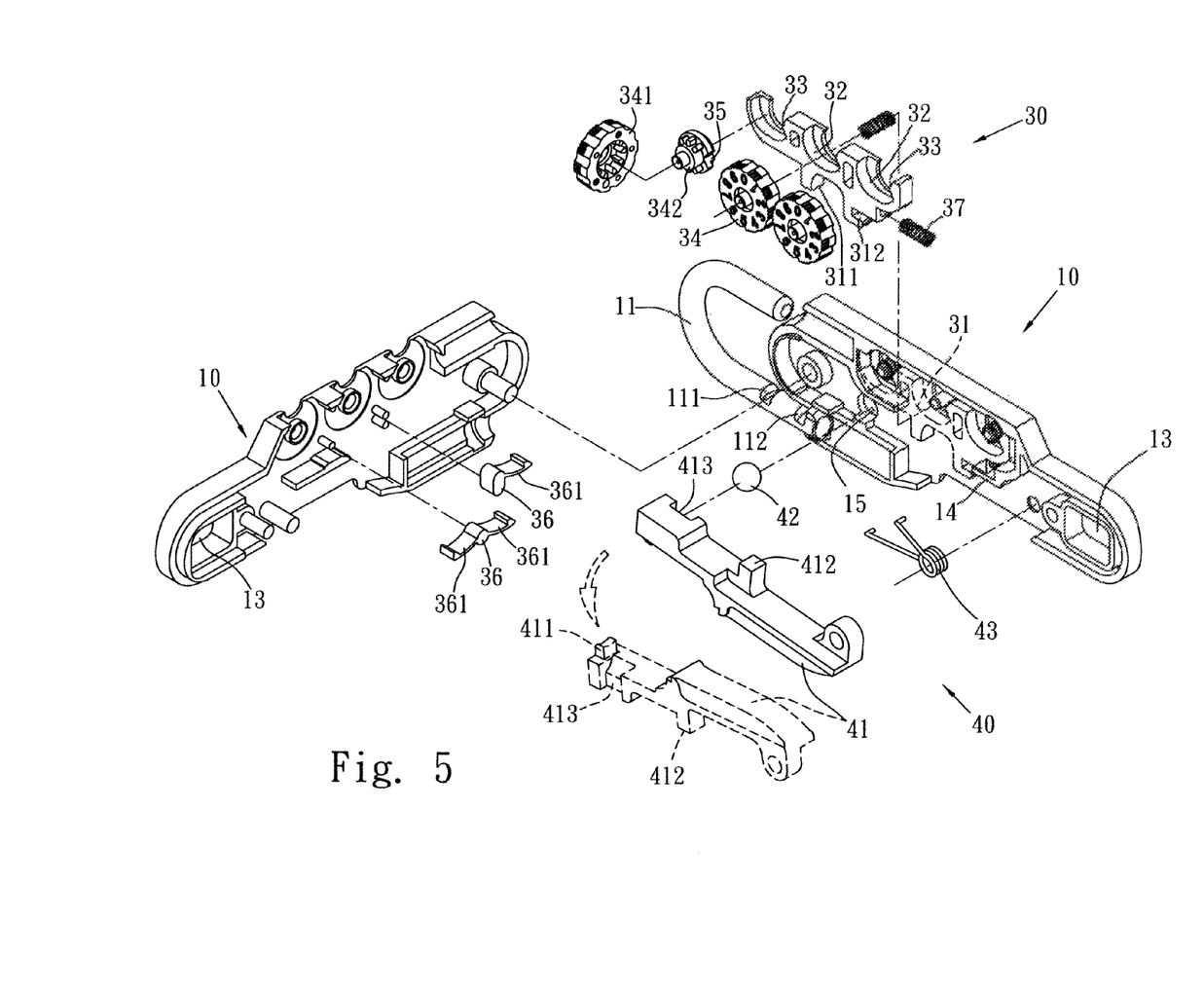
FIG. 5 is an exploded view to show the bicycle lock set of the present invention.
Figure 6:
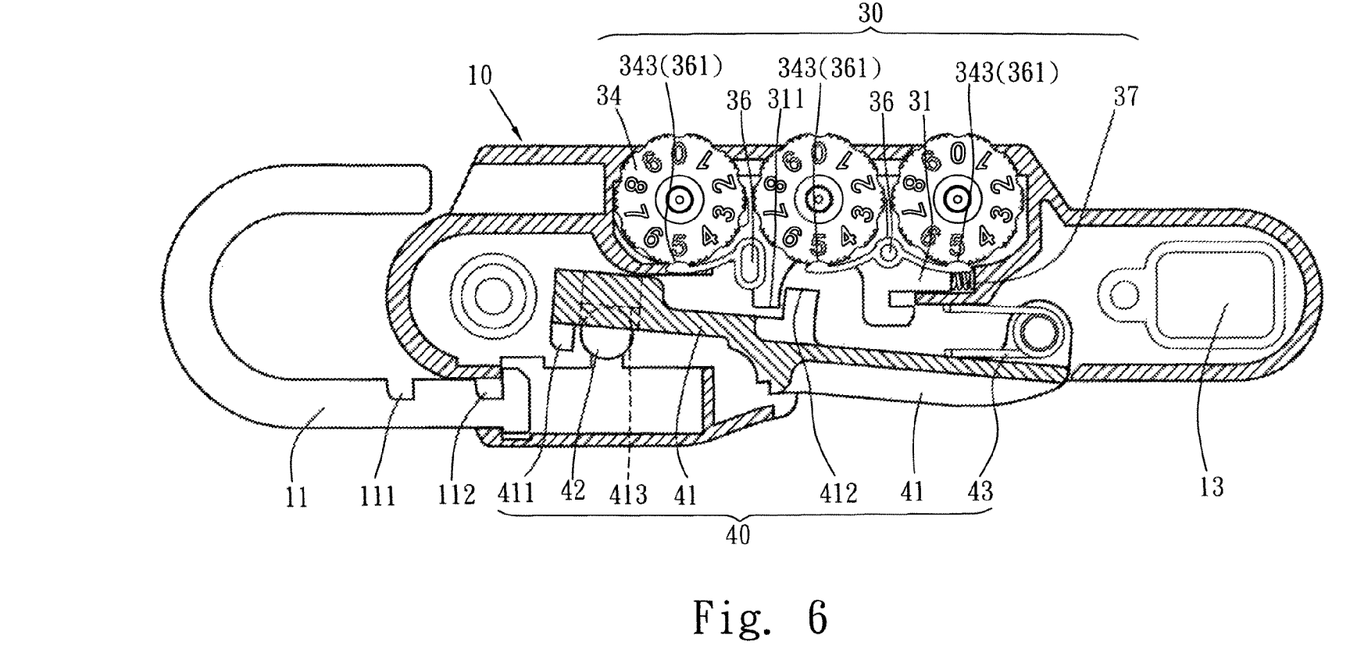
FIG. 6 is a partial cross sectional view of the bicycle lock set of the present invention.
Figure 7:
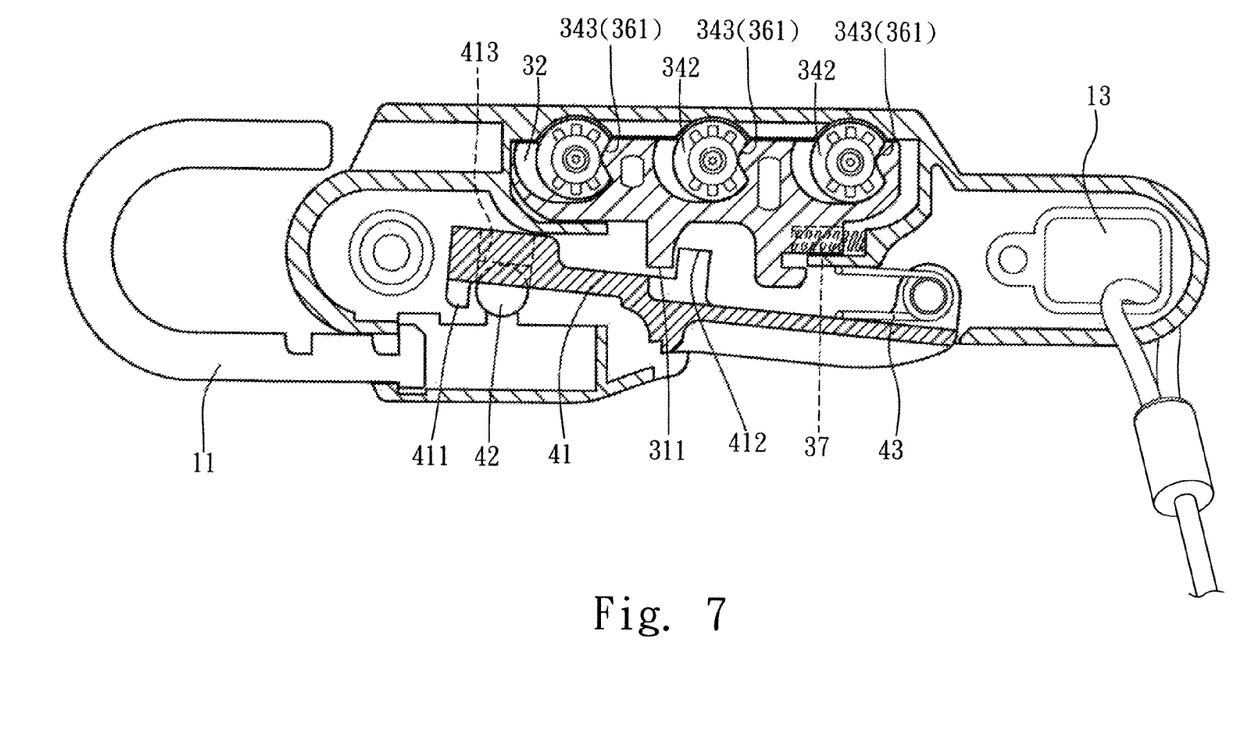
FIG. 7 is a partial cross sectional view of the bicycle lock set of the present invention, wherein the shackle is in unlocked status.
Figure 8:
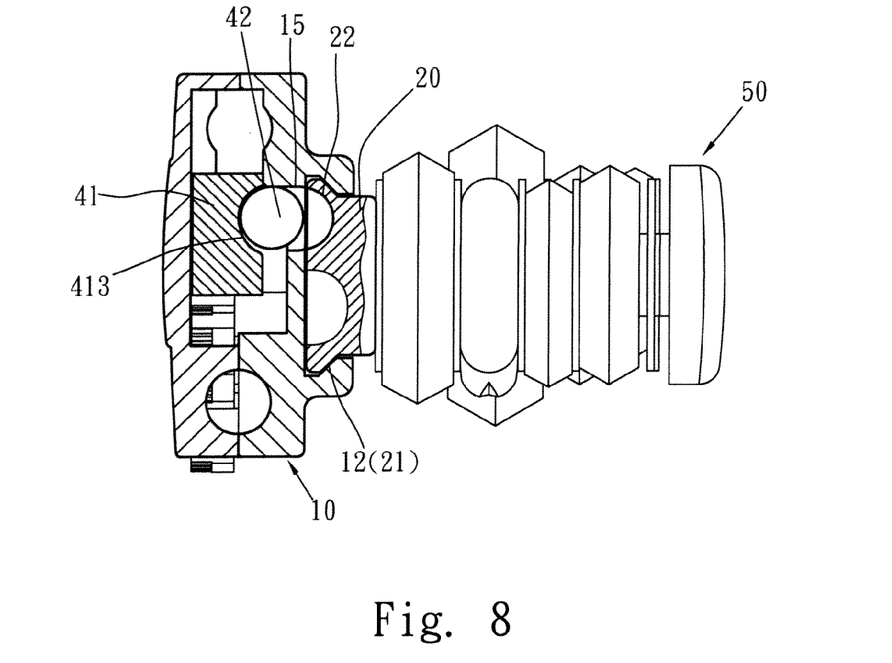
FIG. 8 is an end cross sectional view of the status in FIG. 7.

As shown in FIGS. 7 and 8, when the three number disks 341 are operated correctly, the second contact portions 35 of the driven members 342 are in contact with the first contact portion 33 so that the frame 31 is linearly moved to a position where the first and second protrusions 311, 412 are not in alignment with each other. When the user pushes the operation member 41, the locked status are released and the stud 411 is disengaged from the notch 111 and the cable 60 can be released. In the meanwhile, the bead 42 drops into the receiving space 413 and is removed from the hole 15 and the reception hole 22, so that the main part 10 can be removed from the connection member 20.

Figure 9:
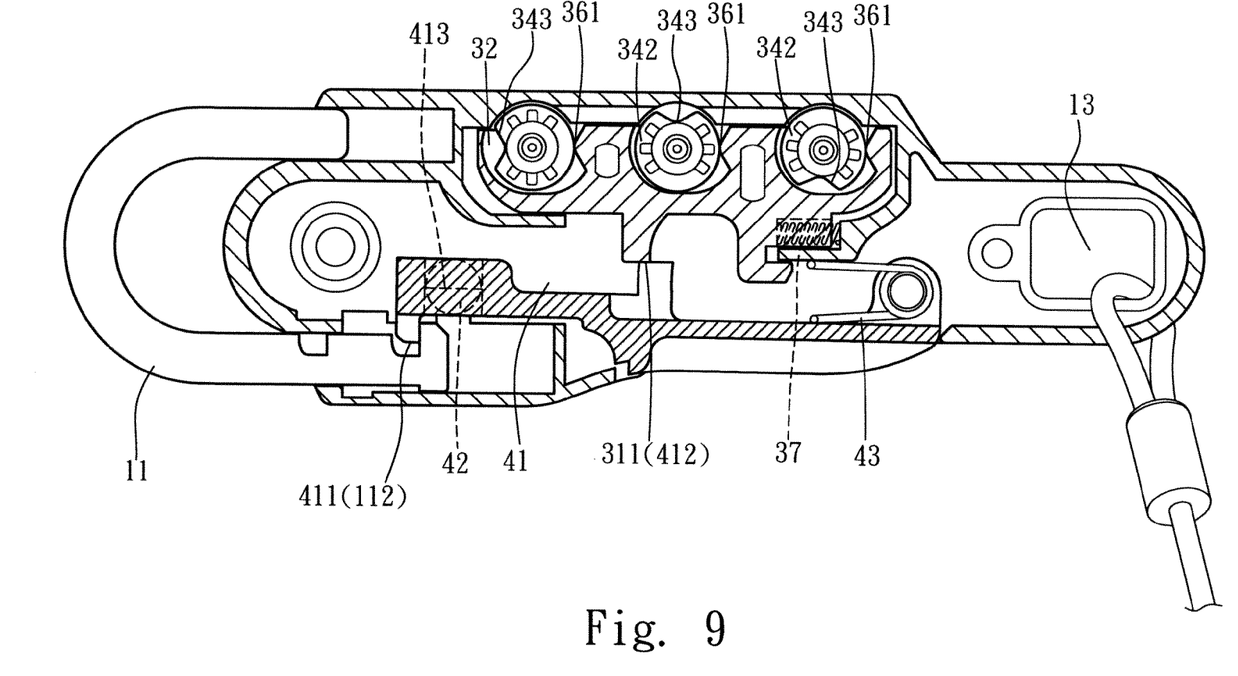
FIG. 9 is a partial cross sectional view of the bicycle lock set of the present invention, wherein the shackle is in locked status.
Figure 10:
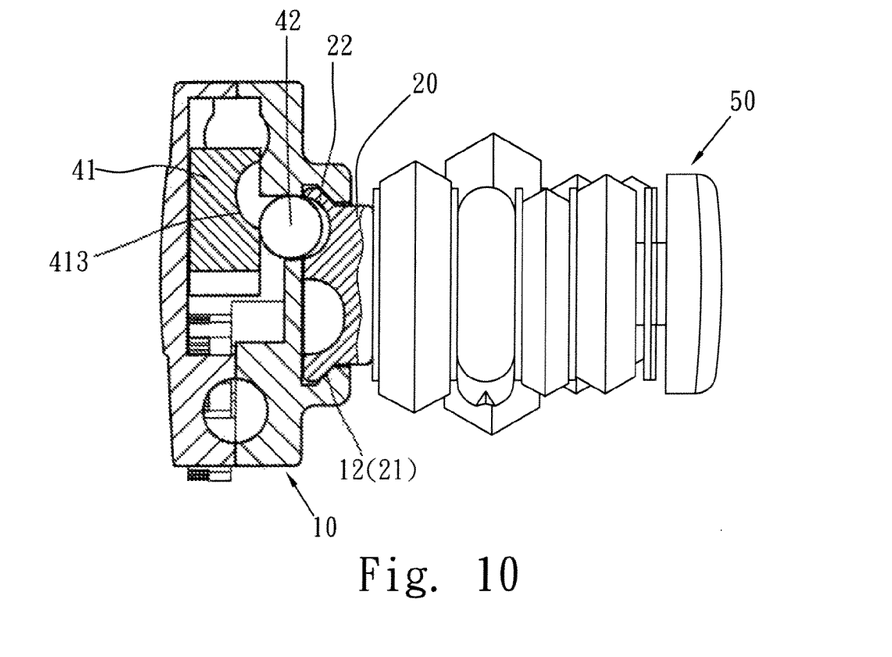
FIG. 10 is an end cross sectional view of the status in FIG. 9.

Referring to FIGS. 9 and 10, when one of the three number disks 341 is wrongly operated, the locking the lock set, the the second contact portions 35 of the driven members 342 are not in contact with the first contact portion 33 so that the frame 31 is linearly moved to a position where the first and second protrusions 311, 412 are in alignment with each other. The user cannot push the operation member 41, the stud 411 is engaged from the notch 111 and the cable 60 cannot be released. The bead 42 cannot drop into the receiving space 413 and is engaged with the hole 15 and the reception hole 22, so that the main part 10 cannot be removed from the connection member 20.

The combination unit 30 and the operation unit 40 can be deactivated by input the correct numbers of the three number disks 341, so that the cable 60 can be removed from the shackle 11 and the bicycle lock set can be separated from the tool set 50. Any one of the number disks 341 is not corrected operated, none of the cable 60 and the operation unit 40 can be operated, and the lock set is still connected to the tool set 50.

The bicycle lock set can be connected to any accessory of the bicycle such as the tool set 50 by connecting the connection member 20 to the accessory. The main part 10, the combination unit 309 and the operation unit 40 are connected to the tool set 50. The lock set is well positioned on the bicycle. Once the number disks 341 are correctly operated, the operation unit 40 is released, the main part 10 can be separated from the connection member 20.

Figure 11:
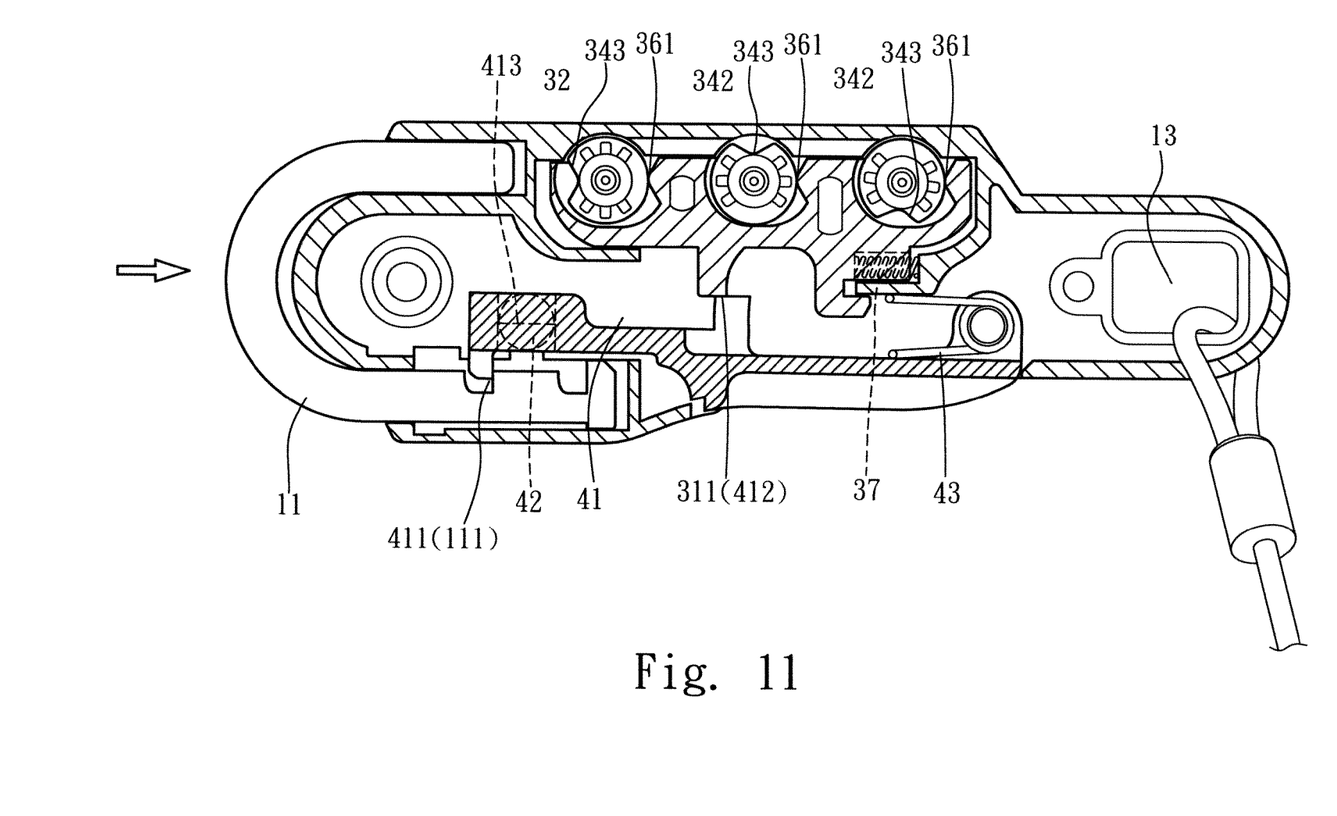
FIG. 11 is a partial cross sectional view of the bicycle lock set of the present invention, wherein the shackle is retracted into the main part.

As shown in FIG. 11, when the shackle 11 is pushed into the main part 10 to reduce the volume the lock set occupies, the three number disks 341 are correctly operated and the first and second protrusions 311, 412 are no in alignment with each other, so that the operation member 41 can be pushed to remove the stud 411 from the notch 112.

The shackle 11 can be further inserted into the main part 10 by having two notches 111, 112 so that the shackle 11 is matched to the main part 10 to reduce the volume it applies and avoid from being contact with other objects.

The first and second protrusions 14, 312 ensure that the frame 31 moves linearly, and also prevent the off-set of the frame 31 in the main part 10 to affect the functions of the lock set. The first and second engaging portions 12, 21 are dovetailed shaped to increase the contact area therebetween so that the two parts can be firmly connected to each other.

Figure 12:
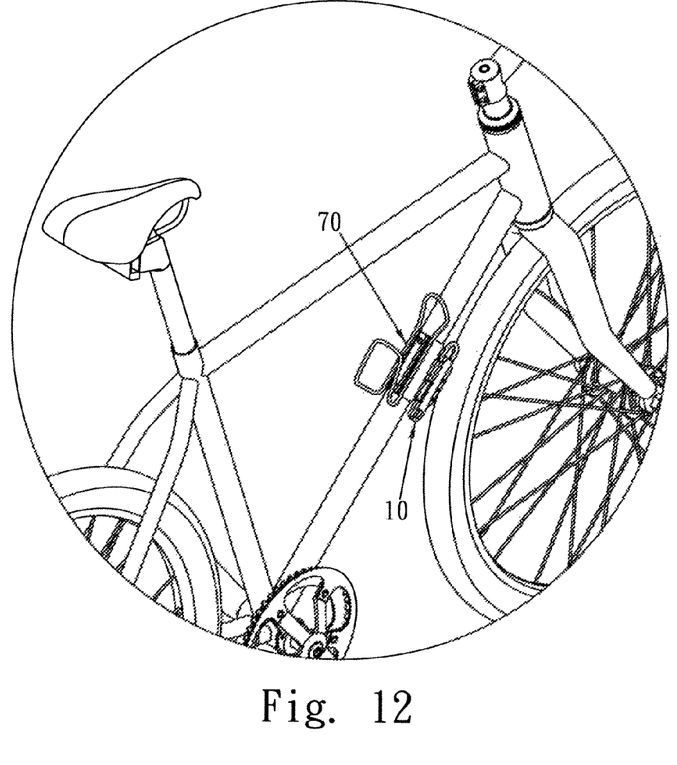
FIG. 12 shows that the bicycle lock set of the present invention is connected with a water bottle rack.
Figure 13:
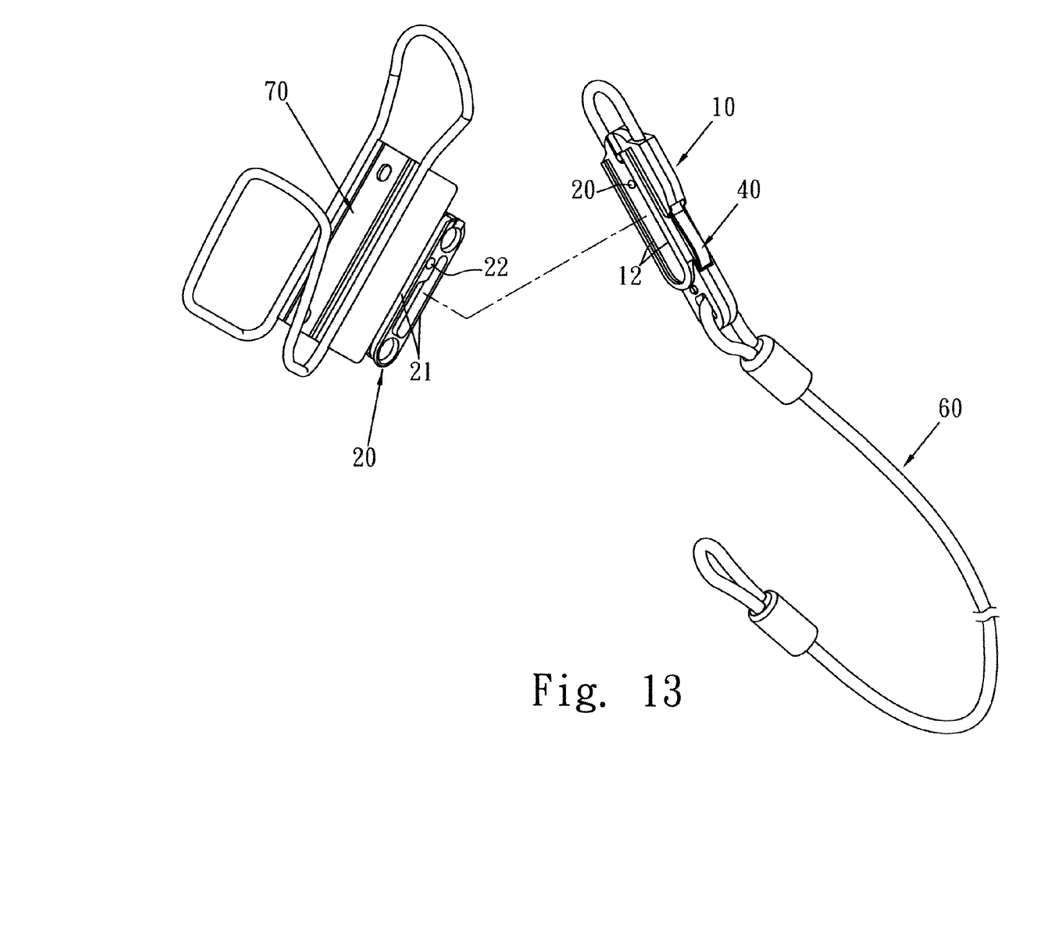
FIG. 13 is an exploded view to show the bicycle lock set of the present invention and the water bottle rack.

As shown in FIGS. 12 and 13, another embodiment of the use of the lock set is that the connection member 20 is connected to a water bottle rack 70, and the rest of the parts of the lock set are the same as previously described.

While we have shown and described the embodiment in accordance with the present invention, it should be clear to those skilled in the art that further embodiments may be made without departing from the scope of the present invention.

What is claimed is:

1. A bicycle lock set comprising:
a main part having a shackle movably connected to a first end thereof, the shackle having at least one notch;
a connection member removably connected to a side of the main part and having a reception hole defined in a side thereof which faces the main part;
a combination unit located in the main part and having a frame which is linearly movable in the main part, the frame having at least one first contact portion and at least one number wheel rotatably connected to the frame and located corresponding to the at least one first contact portion, the at least one number wheel having a second contact portion defined in an outer surface thereof so as to be engaged with the at least one first contact portion, and
an operation unit located in the main part and having an operation member which is driven and rotated by the frame, the operation member having a stud located corresponding to the at least one notch, a receiving space defined in the operation member, a bead being partially received in the receiving space or being pushed to be partially protruded out from the main part so as to be engaged with the reception hole, the stud being engaged with the at least one notch when the shackle is moved toward the main part.

2. The bicycle lock set as claimed in claim 1, wherein the main part includes a first engaging portion defined in a surface thereof and the connection member includes a second engaging portion extending from a surface thereof and the second engaging portion being engaged with the first engaging portion when the main part is connected with the connection member, the bead and the reception hole are respectively located on the two respective facing surfaces of the main part and the connection member.

3. The bicycle lock set as claimed in claim 1, wherein the frame includes a first protrusion and the operation member includes a second protrusion which is pushed by the first protrusion so that the operation member is pivoted when the frame linearly moves.

4. The bicycle lock set as claimed in claim 1, wherein the main part has a hole defined in a second end thereof and a cable has one end secured to the hole.

5. The bicycle lock set as claimed in claim 1, wherein the combination unit includes a first spring whose two ends respectively contact the main part and the frame so as to provide a return force to the frame, the operation unit includes a second spring whose two ends respectively contact the main part and the operation member so as to provide a return force to the operation member.

6. The bicycle lock set as claimed in claim 1, wherein the at least one number wheel includes multiple positioning recesses defined in an outer surface thereof and a spring member is fixed to the main part, the spring member includes a protrusion which is engaged with one of the positioning recesses to position the at least one number wheel.

7. The bicycle lock set as claimed in claim 1, wherein the at least one number wheel includes a number disk and a driven member which is pivotably connected to the main part, the second contact portion is located on an outer periphery of the driven member and the number disk is mounted to the driven member and rotates the driven member.

8. The bicycle lock set as claimed in claim 1, wherein the connection member is connected with a tool set.

9. The bicycle lock set as claimed in claim 1, wherein the connection member is connected with a water bottle rack.

10. The bicycle lock set as claimed in claim 1, wherein the frame includes at least one recess and the at least one number wheel is located in the at least one recess and pivotably connected to the main part, the at least one first contact portion is defined in an inner periphery of the at least one recess and the second contact portion on the at least one number wheel is engaged with the at least one first contact portion when the at least one number wheel is rotated.

* * * * *